US012335713B2

(12) United States Patent
Zhang et al.

(10) Patent No.: US 12,335,713 B2
(45) Date of Patent: Jun. 17, 2025

(54) SPEAKER

(71) Applicant: AAC Microtech (Changzhou) Co., Ltd., Jiangsu (CN)

(72) Inventors: Long Zhang, Changzhou (CN); Jiasheng Zhou, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 264 days.

(21) Appl. No.: 18/324,141

(22) Filed: May 25, 2023

(65) Prior Publication Data

US 2024/0284117 A1 Aug. 22, 2024

Related U.S. Application Data

(63) Continuation of application No. PCT/CN2023/076312, filed on Feb. 16, 2023.

(51) Int. Cl.

| | |
|---|---|
| ***H04R 3/00*** | (2006.01) |
| ***H04R 7/04*** | (2006.01) |
| ***H04R 9/02*** | (2006.01) |
| ***H04R 9/04*** | (2006.01) |
| ***H04R 9/06*** | (2006.01) |
| *H04R 1/02* | (2006.01) |

(52) U.S. Cl.

CPC ............... *H04R 9/063* (2013.01); *H04R 3/00* (2013.01); *H04R 7/04* (2013.01); *H04R 9/025* (2013.01); *H04R 9/046* (2013.01); *H04R 2400/11* (2013.01)

(58) Field of Classification Search

CPC . H04R 9/063; H04R 3/00; H04R 7/04; H04R 9/025; H04R 9/046; H04R 2400/11

USPC .................................................. 381/117, 342

See application file for complete search history.

(56) References Cited

U.S. PATENT DOCUMENTS

2021/0274289 A1* 9/2021 Wang .................. H04R 1/2834

* cited by examiner

*Primary Examiner* — Ammar T Hamid

(74) *Attorney, Agent, or Firm* — Wiersch Law Group

(57) ABSTRACT

The present invention provides a speaker including a first frame, a second frame, a first vibration system, a second vibration system, and a magnetic circuit system. The first vibration system includes a first diaphragm and a pair of first voice coils. The second vibration system includes a second diaphragm and a pair of second voice coils. The pair of first voice coils is arranged spaced apart from each other in a first direction. The pair of second voice coils is arranged spaced apart from each other in a second direction. The first and second directions are perpendicular to a vibration direction of the first diaphragm. The first direction is perpendicular to the second direction. Winding planes of the first and second voice coils are parallel to the vibration direction. The speaker of the present invention has strong anti-swing ability and can save space in the height direction.

7 Claims, 3 Drawing Sheets

SPEAKER

FIELD OF THE PRESENT INVENTION

The present invention relates to the field of electro-acoustic conversion, and more particularly, to a back-to-back speaker.

DESCRIPTION OF RELATED ART

Speaker, also known as horn, is used in speaker boxes to convert audio signals into sound. As customers' requirements for consumer electronics products increase, the speakers are given more requirements.

Back-to-back speaker refers to the speaker has two groups of vibration systems, and the two groups of vibration systems are set back to back. In related art, the back-to-back speaker includes two diaphragms and two voice coils, and the two voice coils are set up and down. The larger voice coil is arranged around the smaller voice coil. The two voice coils are driven separately. The amplitudes of the two diaphragms of this back-to-back speaker are not synchronized. The leakage effect of the speaker is poor. When two voice coils drive the corresponding diaphragm respectively, both voice coils need to avoid the thickness of the pole plate of the magnetic circuit system of the other side in the height direction.

Therefore, it is desired to provide a new speaker which can overcome the above problems.

SUMMARY

In view of the above, the embodiment of the present invention provides a new speaker. By the present invention, the leakage effect of the speaker is good, and the height of the speaker is reduced.

The present invention provides a speaker including a first frame, a second frame relatively fixed with the first frame, a first vibration system supported on a side of the first frame distal to the second frame, a second vibration system supported on a side of the second frame distal to the first frame, and a magnetic circuit system located between the first frame and the second frame. The first vibration system includes a first diaphragm and a pair of first voice coils connected with the first diaphragm and driving the first diaphragm to generate sounds. The second vibration system includes a second diaphragm and a pair of second voice coils connected with the second diaphragm and driving the second diaphragm to generate sounds. The pair of first voice coils is arranged spaced apart from each other in a first direction. The pair of second voice coils is arranged spaced apart from each other in a second direction. The first direction is perpendicular to a vibration direction of the first diaphragm, and the second direction is perpendicular to a vibration direction of the second diaphragm. The first direction is perpendicular to the second direction. A winding plane of each first voice coil is parallel to the vibration direction of the first diaphragm, and a winding plane of each second voice coil is parallel to the vibration direction of the second diaphragm.

As an improvement, the magnetic circuit system includes a first main magnet closed to the first diaphragm, a second main magnet stacked with the first main magnet, a plurality of first auxiliary magnets surrounding the first main magnet, and a plurality of second auxiliary magnets surrounding the second main magnet, a magnetic gap formed between a stacked structure of the first main magnet and the second main magnet and the stacked structure of the first auxiliary magnets and the second auxiliary magnets, and both the pair of first voice coils and the pair of second voice coils at least partially located in the magnetic gap.

As an improvement, the magnetic circuit system further includes a pole plate located between the first main magnet and the second main magnet and between the first auxiliary magnets and the second auxiliary magnets, the pole plate including a pair of first avoiding holes avoiding the first voice coils and a pair of second avoiding holes avoiding the second voice coils.

As an improvement, the magnetic circuit system further includes a first main pole plate stacked on the first main magnet, a first auxiliary pole plate stacked on the first auxiliary magnets, a second main pole plate stacked under the second main magnet, a second auxiliary pole plate stacked under the second auxiliary magnets.

As an improvement, the first auxiliary pole plate is embedded and fixed in the first frame, and the second auxiliary pole plate is embedded and fixed in the second frame.

As an improvement, the first vibration system further includes a first circuit board located between the first frame and the first diaphragm, the first circuit board including a first fixation portion mounted with the first frame, a second fixation portion mounted with the first diaphragm, and a first connection portion connecting the first fixation portion and the second fixation portion, the first voice coils secured with the first diaphragm through the second fixation portion, the second vibration system further including a second circuit board located between the second frame and the second diaphragm, the second circuit board including a third fixation portion mounted with the second frame, a forth fixation portion mounted with the second diaphragm, and a second connection portion connecting the third fixation portion and the forth fixation portion, the second voice coils secured with the second diaphragm through the forth fixation portion.

As an improvement, the speaker is rectangular, the first direction is a short axis direction of the speaker, and the second direction is a long axis direction of the speaker.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
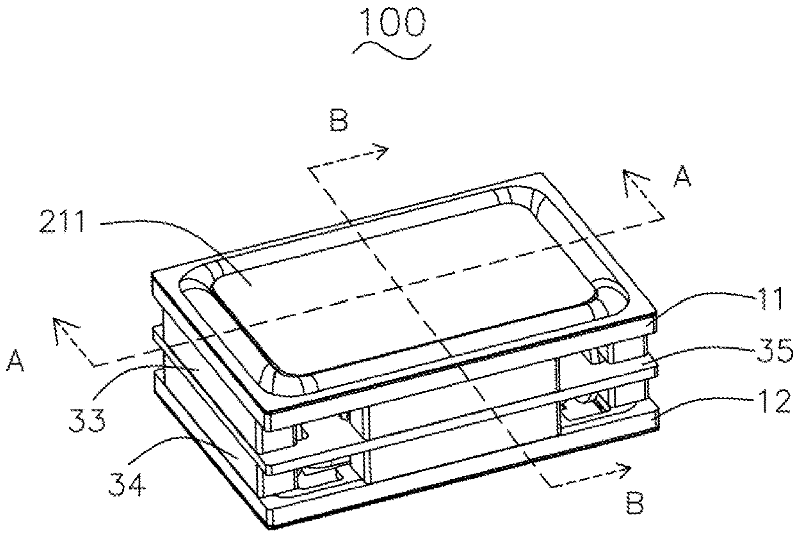
FIG. 1 is an illustrative isometric view of a speaker in accordance with one embodiment of the present invention.
Figure 2:
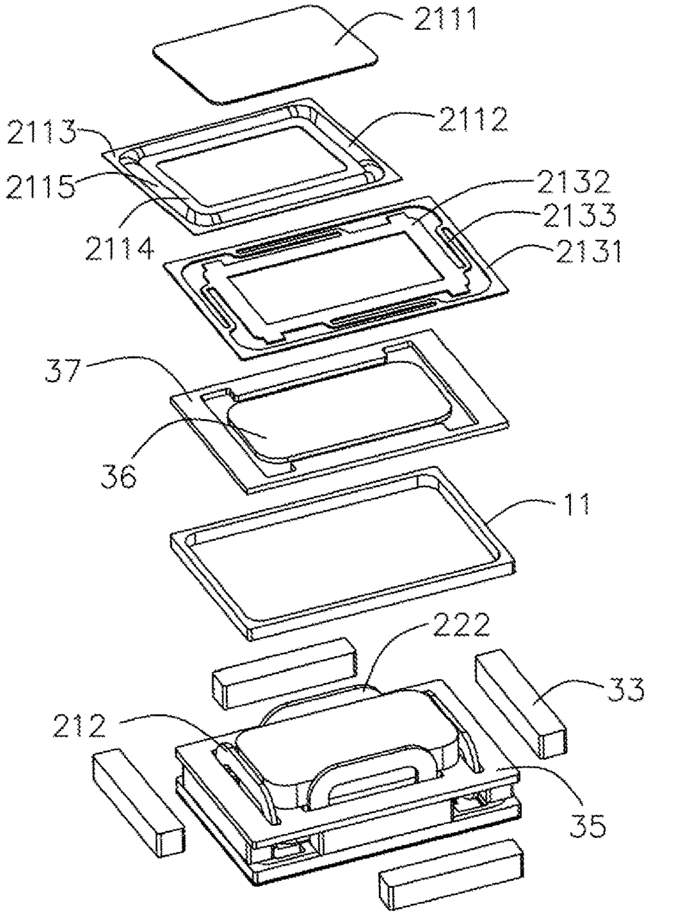
FIG. 2 is a partially exploded view of the speaker of FIG. 1.
Figure 3:
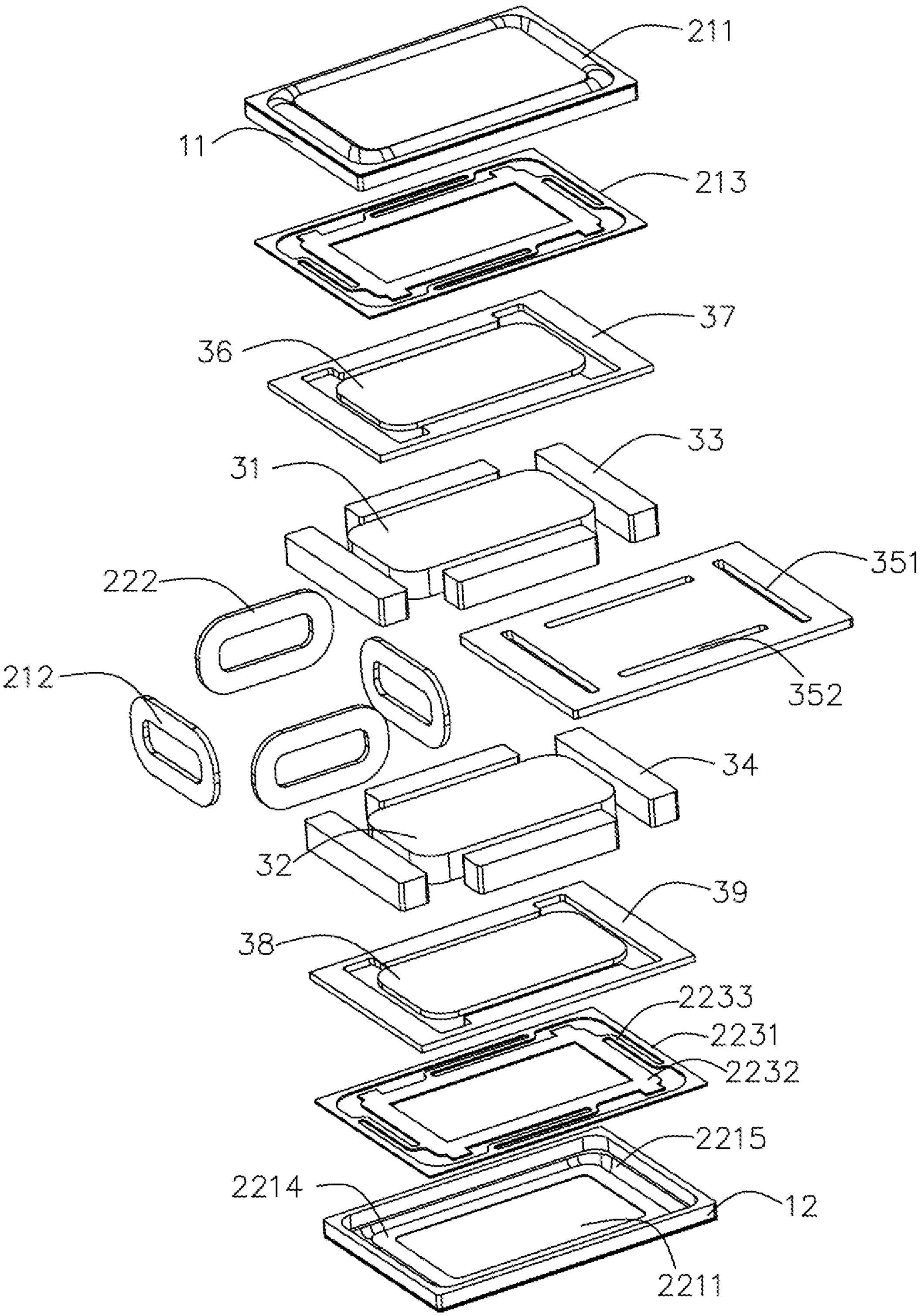
FIG. 3 is an exploded view of the speaker of FIG. 1.
Figure 4:
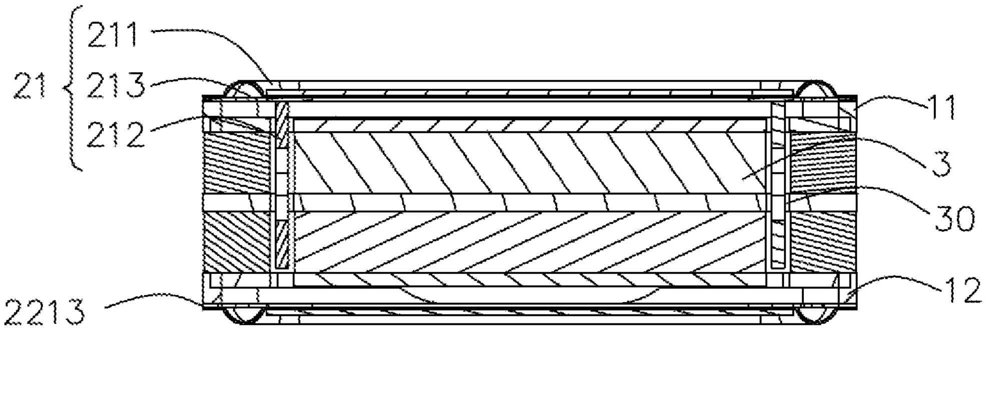
FIG. 4 is an illustrative cross-sectional view of the speaker taken along line A-A of FIG. 1.
Figure 5:
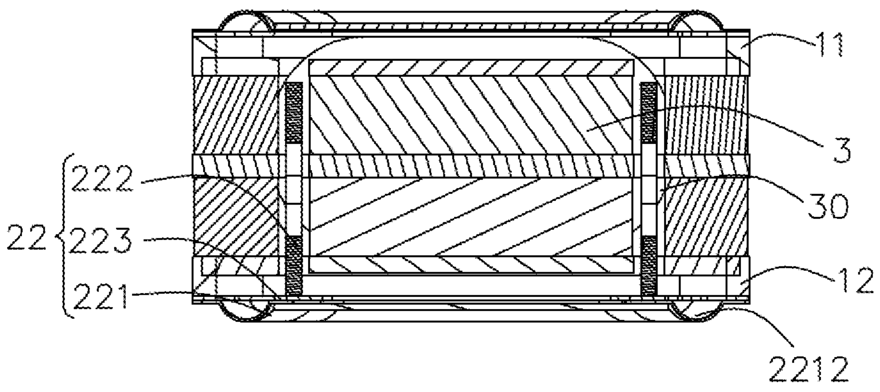
FIG. 5 is an illustrative cross-sectional view of the speaker taken along line B-B of FIG. 1.

Referring to the FIGS. 1-5, the present invention provides one embodiment of a speaker 100. The speaker 100 includes a first frame 11, a second frame 12 relatively fixed with the first frame 11, a first vibration system 21 supported on a side of the first frame 11 distal to the second frame 12, a second vibration system 22 supported on a side of the second frame 12 distal to the first frame 11, and a magnetic circuit system 3 located between the first frame 11 and the second frame 12. The magnetic circuit system 3 drives the first vibration system 21 and the second vibration system 22 to vibrate and sound. The speaker 100 has a rectangular shape. A first direction is defined as a short axis direction of the speaker 100, and a second direction is defined as a long axis direction of the speaker 100. The first vibration system 21 and the second vibration system 22 vibrate along a direction of the thickness of the speaker 100. The first direction is perpendicular to the second direction, and both the first direction and the second direction are perpendicular to the vibration direction of the first vibration system 21 and the second vibration system 22.

The first frame 11 is a rectangular annular hollow structure. The structure of the second frame 12 is same as the structure of the first frame 11. The second frame 12 is also a rectangular annular hollow structure.

The first vibration system 21 includes a first diaphragm 211, a pair of first voice coils 212 connected with the first diaphragm 211 and driving the first diaphragm 211 to generate sounds, and a first circuit board 213 located between the first frame 11 and the first diaphragm 211. The sound direction of the first diaphragm 211 is upward along the vibration direction, that is, the sounding direction of the first diaphragm 211 is in front of the speaker 100. The first diaphragm 211 includes a first dome 2111 and a first suspension 2112 with a ring shape. The first suspension 2112 is arranged surrounding the first dome 2111. The first suspension 2112 includes a first end portion 2113 mounted to the first frame 11, a second end portion 2114 mounted to a surface of the first dome 2111 proximal to the magnetic circuit system 3, and a first suspension portion 2115 connecting the first end portion 2113 and the second end portion 2114.

The pair of first voice coils 212 are arranged vertically and spaced apart from each other on two sides of the first diaphragm 211 in the first direction. That is, each side of the first diaphragm 211 is provided with one first voice coil 212. A winding plane of each first voice coil 212 is parallel to the vibration direction of the first diaphragm 211. Similarly, the pair of first voice coils 212 also can be arranged vertically and spaced apart from each other on two sides of the first diaphragm 211 in the second direction.

The first circuit board 213 includes a first fixation portion 2131 mounted with the first frame 11, a second fixation portion 2132 mounted with the first diaphragm 211, and a first connection portion 2133 connecting the first fixation portion 2131 and the second fixation portion 2132. The first fixation portion 2131 has an annular shape and is sandwiched between the first frame 11 and the first end portion 2113 of the first suspension 2112. The second fixation portion 2132 also has an annular shape and is attached to the second end portion 2114 of the first suspension 2112. The first voice coils 212 are secured with the first diaphragm 211 through the second fixation portion 2132. The first connection portion 2133 locates on the position of the first suspension portion 2115.

The second vibration system 22 has a substantially same structure with the first vibration system 21. The second vibration system 22 includes a second diaphragm 221 and a pair of second voice coils 222 connected with the second diaphragm 221 and driving the second diaphragm 221 to generate sounds, and a second circuit board 223 located between the second frame 12 and the second diaphragm 221. The sound direction of the second diaphragm 221 is downward along the vibration direction, that is, the sounding direction of the first diaphragm 211 is in back of the speaker 100. The second diaphragm 221 includes a second dome 2211 and a second suspension 2212 with a ring shape. The second suspension 2212 is arranged surrounding the second dome 2211. The second suspension 2212 includes a third end portion 2213 mounted to the second frame 12, a forth end portion 2214 mounted to the surface of the second dome 2211 proximal to the magnetic circuit system 3, and a second suspension portion 2215 connecting the third end portion 2213 and the forth end portion 2214.

The pair of second voice coils 222 are arranged vertically and spaced apart from each other on two sides of the second diaphragm 221 in the second direction. That is, each side of the second diaphragm 221 is provided with one second voice coil 222. A winding plane of each second voice coil 222 is parallel to the vibration direction of the second diaphragm 221. Similarly, the pair of second voice coils 222 also can be arranged vertically and spaced apart from each other on two sides of the second diaphragm 221 in the first direction.

The second circuit board 223 includes a third fixation portion 2231 mounted with the second frame 12, a forth fixation portion 2232 mounted with the second diaphragm 221, and a second connection portion 2233 connecting the third fixation portion 2231 and the forth fixation portion 2232. The third fixation portion 2231 has an annular shape and is sandwiched between the second frame 12 and the third end portion 2213 of the second suspension 2212. The forth fixation portion 2232 also has an annular shape and is attached to the forth end portion 2214 of the second suspension 2212. The second voice coils 222 are secured with the second diaphragm 221 through the forth fixation portion 2232. The second connection portion 2233 locates on the position of the second suspension portion 2215.

The magnetic circuit system 3 includes a first main magnet 31 closed to the first diaphragm 211, a second main magnet 32 stacked with the first main magnet 31, a plurality of first auxiliary magnets 33 surrounding the first main magnet 31, a plurality of second auxiliary magnets 34 surrounding the second main magnet 32, a pole plate 35 located between the first main magnet 31 and the second main magnet 32 and between the first auxiliary magnets 33 and the second auxiliary magnets 34, a first main pole plate 36 stacked on the first main magnet 31, a first auxiliary pole plate 37 stacked on the first auxiliary magnets 33, a second main pole plate 38 stacked under the second main magnet 32, and a second auxiliary pole plate 39 stacked under the second auxiliary magnets 34. The number of the first auxiliary magnets 33 is four, and the number of the second auxiliary magnets 34 is also four. A magnetic gap 30 is formed between a stacked structure of the first main magnet 31 and the second main magnet 32 and the stacked structure of the first auxiliary magnets 33 and the second auxiliary magnets 34. The pair of first voice coils 212 at least partially locate in the portion of the magnetic gap 30 located in the first direction, and the pair of the second voice coils 222 at least partially locate in the portion of the magnetic gap 30 located in the second direction.

The pole plate 35 includes a pair of first avoiding holes 351 avoiding the first voice coils 212 and a pair of second avoiding holes 352 avoiding the second voice coils 222. The two first avoiding holes 351 are symmetrically arranged on both sides of the pole plate 35 in the first direction, and the two second avoiding holes 352 are symmetrically arranged on both sides of the pole plate 35 in the second direction.

The first auxiliary pole plate 37 has an annular shape and is embedded and fixed in the first frame 11, and the second auxiliary pole plate 39 also has an annular shape and is embedded and fixed in the second frame 12.

Compared with related technologies, the present invention provides a speaker including a first frame, a second frame relatively fixed with the first frame, a first vibration system supported on a side of the first frame distal to the second frame, a second vibration system supported on a side of the second frame distal to the first frame, and a magnetic circuit system located between the first frame and the second frame. The first vibration system includes a first diaphragm and a pair of first voice coils connected with the first diaphragm and driving the first diaphragm to generate sounds. The second vibration system includes a second diaphragm and a pair of second voice coils connected with the second diaphragm and driving the second diaphragm to generate sounds. The pair of first voice coils is arranged spaced apart from each other in a first direction. The pair of second voice coils is arranged spaced apart from each other in a second direction. The first direction is perpendicular to a vibration direction of the first diaphragm, and the second direction is perpendicular to a vibration direction of the second diaphragm. The first direction is perpendicular to the second direction. A winding plane of each first voice coil is parallel to the vibration direction of the first diaphragm, and a winding plane of each second voice coil is parallel to the vibration direction of the second diaphragm.

The two pairs of voice coils of the speaker are arranged vertically, and each diaphragm is bonded with two voice coils to form a stable driving structure. The speaker of the present invention has strong anti-swing ability, the amplitudes of the two diaphragms of the speaker are synchronized, and the leakage effect of the speaker is good. The speaker can save space in the height direction.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the 10 full extent indicated by the broad general meaning of the terms where the appended claims are expressed.

What is claimed is:

1. A speaker, comprising:

a first frame;

a second frame relatively fixed with the first frame;

a first vibration system supported on a side of the first frame distal to the second frame, the first vibration system comprising a first diaphragm and a pair of first voice coils connected with the first diaphragm and driving the first diaphragm to generate sounds, the pair of first voice coils arranged spaced apart from each other in a first direction, the first direction perpendicular to a vibration direction of the first diaphragm, a winding plane of each first voice coil parallel to the vibration direction of the first diaphragm;

a second vibration system supported on a side of the second frame distal to the first frame, the second vibration system comprising a second diaphragm and a pair of second voice coils connected with the second diaphragm and driving the second diaphragm to generate sounds, the pair of second voice coils arranged spaced apart from each other in a second direction, the second direction perpendicular to a vibration direction of the second diaphragm, the first direction perpendicular to the second direction, a winding plane of each second voice coil parallel to the vibration direction of the second diaphragm; and a magnetic circuit system located between the first frame and the second frame.

2. The speaker as described in claim 1, wherein the magnetic circuit system comprises a first main magnet closed to the first diaphragm, a second main magnet stacked with the first main magnet, a plurality of first auxiliary magnets surrounding the first main magnet, and a plurality of second auxiliary magnets surrounding the second main magnet, a magnetic gap formed between a stacked structure of the first main magnet and the second main magnet and the stacked structure of the first auxiliary magnets and the second auxiliary magnets, and both the pair of first voice coils and the pair of second voice coils at least partially located in the magnetic gap.

3. The speaker as described in claim 2, wherein the magnetic circuit system further comprises a pole plate located between the first main magnet and the second main magnet and between the first auxiliary magnets and the second auxiliary magnets, the pole plate comprising a pair of first avoiding holes avoiding the first voice coils and a pair of second avoiding holes avoiding the second voice coils.

4. The speaker as described in claim 3, wherein the magnetic circuit system further comprises a first main pole plate stacked on the first main magnet, a first auxiliary pole plate stacked on the first auxiliary magnets, a second main pole plate stacked under the second main magnet, a second auxiliary pole plate stacked under the second auxiliary magnets.

5. The speaker as described in claim 4, wherein the first auxiliary pole plate is embedded and fixed in the first frame, and the second auxiliary pole plate is embedded and fixed in the second frame.

6. The speaker as described in claim 1, wherein the first vibration system further comprises a first circuit board located between the first frame and the first diaphragm, the first circuit board comprising a first fixation portion mounted with the first frame, a second fixation portion mounted with the first diaphragm, and a first connection portion connecting the first fixation portion and the second fixation portion, the first voice coils secured with the first diaphragm through the second fixation portion, the second vibration system further comprising a second circuit board located between the second frame and the second diaphragm, the second circuit board comprising a third fixation portion mounted with the second frame, a forth fixation portion mounted with the second diaphragm, and a second connection portion connecting the third fixation portion and the forth fixation portion, the second voice coils secured with the second diaphragm through the forth fixation portion.

7. The speaker as described in claim 1, wherein the speaker is rectangular, the first direction is a short axis direction of the speaker, and the second direction is a long axis direction of the speaker.

* * * * *